United States Patent [19]

Jacob

[11] Patent Number: 4,787,758
[45] Date of Patent: Nov. 29, 1988

[54] ROLLER BEARING WITH CYLINDRICAL ROLLERS

[76] Inventor: Werner Jacob, Briandring 29, 6000 Frankfurt 70, Fed. Rep. of Germany

[21] Appl. No.: 876,885
[22] PCT Filed: Sep. 5, 1985
[86] PCT No.: PCT/DE85/00308
§ 371 Date: Aug. 4, 1986
§ 102(e) Date: Aug. 4, 1986
[87] PCT Pub. No.: WO86/01566
PCT Pub. Date: Mar. 13, 1986

[51] Int. Cl.⁴ .............. F16C 43/04; F16C 43/06; F16C 33/58
[52] U.S. Cl. ................... 384/559; 384/508; 384/561; 384/564; 29/148.4 A; 29/148.4 C
[58] Field of Search ............... 384/507–509, 384/511, 515, 516, 539, 559, 560, 561, 564, 569, 584; 29/148.4 A, 148.4 C

[56] References Cited

U.S. PATENT DOCUMENTS

| 927,937 | 7/1909 | Borchardt | 384/508 |
|---|---|---|---|
| 1,212,253 | 1/1917 | Perkins | 384/561 |
| 1,247,288 | 11/1917 | Laycock | 384/561 |
| 1,738,984 | 12/1929 | Brown | 384/559 |
| 1,813,950 | 7/1931 | Pribil | 384/508 |
| 1,970,699 | 8/1934 | Herrmann . | |
| 2,266,175 | 12/1941 | Delaval-Crow | 384/484 |
| 4,325,591 | 4/1982 | Otto . | |
| 4,336,971 | 6/1982 | Reiter . | |

FOREIGN PATENT DOCUMENTS

| 2407477 | 8/1975 | Fed. Rep. of Germany . |
|---|---|---|
| 2107574 | 5/1972 | France . |
| 2279971 | 2/1976 | France . |
| 11463 | of 1907 | United Kingdom ........ 384/507 |

Primary Examiner—Stuart S. Levy
Assistant Examiner—Thomas R. Hannon
Attorney, Agent, or Firm—Steele, Gould & Fried

[57] ABSTRACT

A roller bearing having cylindrical rollers between inner and outer coaxial rings, each of the rings being an integral piece, is fully loaded by insertion of cylindrical rollers through a feed notch. To retain the cylindrical rollers against dropping back through the feed notch, a retaining ring closed in a loop is provided to rest on or in a rim retaining the rollers axially and having the feed notch. The retaining ring, which can also have a sealing part closing the end of the bearing, is mounted such that the retaining ring, the sealing ring and/or a filler piece adapted to fit directly in the feed notch, rests against the open end face of the cylindrical rollers behind the feed notch. The process by which the bearing parts are assembled and secured includes the steps of filling the inner ball race tracks, axially assembly the inner and outer rings, and inserting the rollers for the final ring through a feed notch, thereby axially restricting displacement of the inner and outer rings, and finally retaining the rollers in place by means of the retaining ring. The retaining ring and filler piece can be of metal or relatively harder plastic; the sealing ring can be of relatively softer plastic appropriate for seal packing.

18 Claims, 2 Drawing Sheets

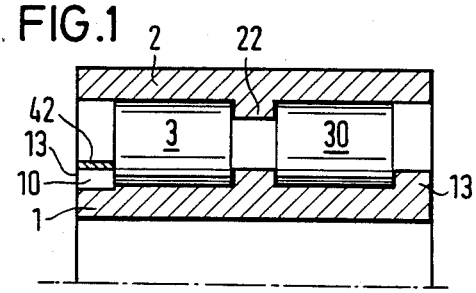
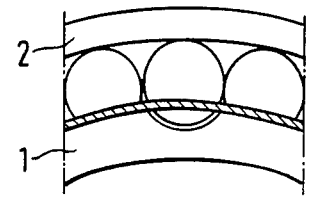
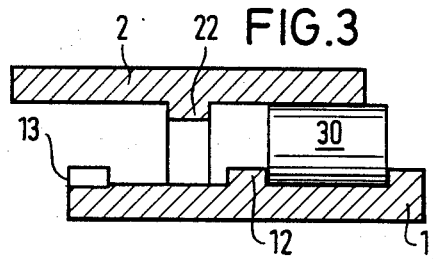
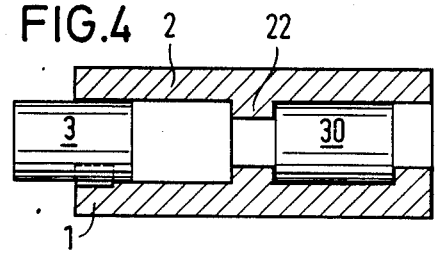
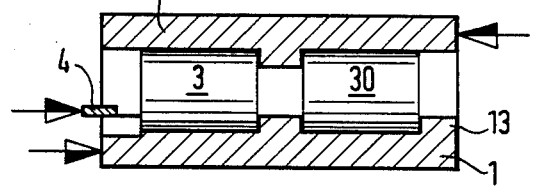
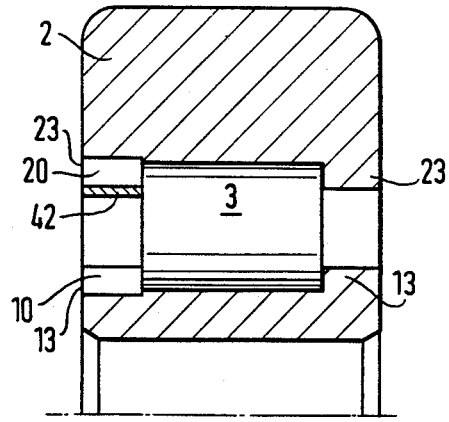
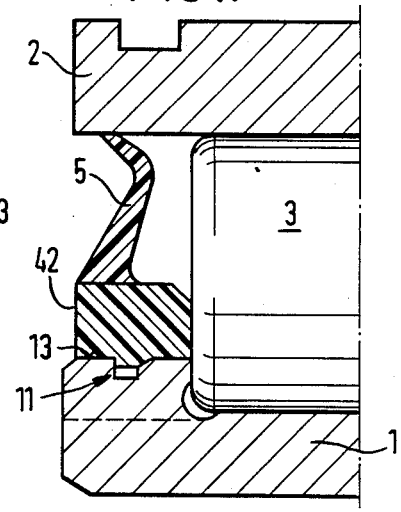

ROLLER BEARING WITH CYLINDRICAL ROLLERS

BACKGROUND OF THE INVENTION

1. Field of the Invention

This invention relates to roller bearings, and in particular to bearings with one or more rows of cylindrical rollers or "balls". The bearing has integral one-piece inner and outer ball race rings equipped with lipped rims confining the rollers to raceways and keeping the roller axes and bearing axis parallel. At least one of the rims has a feed notch for receiving rollers during assembly, and at the feed notch means are provided which prevent any of the cylindrical rollers from dropping out of the raceway into the feed notch.

2. Prior Art

According to the needs of a particular application, roller bearings with cylindrical rollers are known in various different configurations. However, bearings with cylindrical rollers always require some means to ensure that the cylindrical rollers remain with their axes parallel. Roller bearings of this type are possible with an outer ball race ring having two rims confining the rollers and a rimless inner ball race, or vice-versa. For cylindrical roller bearings which are to be used as fixed bearings capable of bearing forces in one or both directions along the axis of rotation (i.e., longitudinal forces with respect to a shaft carried in the bearing), such bearings to date have had three sections. Cylindrical rollers for such axially-loadable bearings are carried between the ball race rings and are confined by rims formed thereon. In order to load the raceway between the bearing rings with the cylindrical rollers, one ball race ring is equipped with two rigid rims and the other ball race ring is equipped with one rigid rim, so that the cylindrical rollers can be inserted. Either a loose rim disc or a separate thrust collar is then added and defines a fourth rim for confining the balls against the single rim ball race ring. Another possibility for loading the raceway requires that each of the ball race rings be manufactured in integral pieces, each having opposed fixed rims, one of the ball races then being split, and both sections at the split being fastened together again with additional fastening devices, after insertion of the cylindrical rollers.

An attempt to surmount these difficulties is disclosed in U.S. Pat. No. 1,212,253. In that patent, the means to prevent the cylindrical rollers from moving from a raceway into a feed notch consists of an expanding spreader ring. This solution has the disadvantage that at a given outer dimension of the bearing, the cylindrical rollers must be made axially shorter by the size of the expanding spreader ring. The carrying capacity of such bearings is therefore smaller than for bearings without an expanding spreader ring. Another disadvantage of such an expanding spreader ring is that both the recess in the race ring and the expanding ring must be manufactured with the greatest precision because the expansion ring has to function as the rim that controls the axial position of the rollers to keep their axes parallel. Manufacture therefore is a very complicated process which practically cannot be performed on an industrial basis because the expanding spreader ring must ensure such exact control of the rollers.

SUMMARY OF THE INVENTION

It is an object of this invention to provide a simple but reliable means to prevent dropping of cylindrical rollers into a feed notch of a bearing, which can be used with open or closed bearings.

This and other objects are achieved according to the invention by a bearing with a retaining ring for retaining the rollers in the raceway, the retaining ring resting on a notched one of the rims and the retaining ring being mounted on the bearing to bear directly or indirectly against an exposed end face of the cylindrical rollers.

The principals of the invention can be embodied in many different variations. With bearings open to the outside, the retaining ring is preferably shaped as a self-contained ring of elastically resilient material, pressed against the cylindrical rollers such that the retaining ring bears directly against the end faces of the cylindrical rollers. The elastically resilient retaining ring is preferably of such a character that it deforms when pushed into place and springs back when inserted, thereby adapting as much as possible to the shape of the rigid rim on the race ring. The elastic rim is thereby immovably fastened to the rigid rim.

In the case of bearings closed to the outside, that is in the case of sealed bearings, the invention is embodied such that the retaining ring and a sealing ring are connected to one another, or are formed as an integral piece, for example of a plastic material. The retaining ring may thereby consist of harder or reinforced plastic, and the sealing ring of softer plastic. For sealed bearings, the sealing ring may be disposed on the retaining ring, whereby the retaining ring by means of an angled edge can be used to secure the sealing ring.

For the embodiment of the invention with the retaining ring connected with the sealing ring, the retaining ring does not have to rest fully against the face of the cylindrical rollers. The retaining ring can be connected to the sealing ring such that the retaining ring is spaced from an edge of the sealing ring and indirectly secures the cylindrical rollers in the area of a feed notch or notches such that the cylindrical rollers are restricted against dropping into the notches. The particular means locking the retaining ring and the sealing ring in position on the one of the rims can also be varied.

For open faced bearings, a retaining ring in the form of a closed-over loop of material can be shrunk on or otherwise inserted with an initial radial stress. This is especially effective if the surface of the rigid rim to receive the retaining ring is of convex shape, which with the initial stress mounting of the retaining ring ensures exact positioning of the retaining ring. One or several locking grooves can be provided for receiving protrusions of the inserted ring. This locking means is especially advantageous when immovably mounting the sealing ring, for example of plastic, which has cold extrusion capabilities and elasticity that in some instances renders further retaining means unnecessary.

According to another characteristic of the invention, integration of a retaining ring and a sealing ring can be achieved in a simple manner through use of a two-component structure, one zone of the sealing ring consisting of a harder plastic than the remainder of the sealing ring. According to another preferred embodiment of the invention, the feed notch can be sealed by a filler piece, which is disposed in the feed notch and is held in place by the retaining ring, the filler piece and/or retaining ring bearing against the end face of the cylindrical rollers. According to another embodiment of the invention, the sealing ring, retaining ring and filler piece may be made as a structural unit which can be attached to the bearing.

This invention concerns not only the cylindrical roller bearing product, but also a process by which the retaining ring, and preferably also the sealing ring, are mounted. These rings are mounted such that the retaining ring, sealing ring and/or filler piece, with an edge facing the cylindrical rollers, are positioned to hold the rollers exactly parallel, reaching just to the same height as the rigid rim otherwise controlling the parallel positioning of the cylindrical rollers. According to the invention, this takes place such that the retaining ring and/or the sealing ring, preferably with the filler piece, are inserted in a direction parallel to the axis and just up to the cylindrical rollers which rest against the rim, thereby avoiding axial play by supporting the bearing rollers. These and other characteristics of the invention are disclosed an claimed herein.

BRIEF DESCRIPTION OF THE DRAWINGS

There are shown in the drawings detailed structural examples of preferred embodiments of the invention, which is also capable of embodiment in additional embodiments. In the drawings, FIG. 1 is a partial cross section of a double row bearing having cylindrical rollers, showing a feed notch and a retaining ring;

FIG. 2 is a partial side view of the bearing of FIG. 1;

FIG. 3 is a schematic illustration of an initial stage of bearing assembly;

FIG. 4 illustrates loading a second row of cylindrical rollers after the inner and outer ball race rings have been axially joined;

FIG. 5 illustrates insertion of the closed retaining ring, thereby eliminating the possibility of axial play of the bearing;

FIG. 6 is a partial section view of a roller open on the outside, with a cylindrical roller track having a retaining ring inserted in place;

FIG. 7 is a partial section view of a retaining ring combined with a sealing ring, which combination comprises a two-component plastic material;

DETAILED DESCRIPTION OF THE PREFERRED EMBODIMENTS

Figure 8:
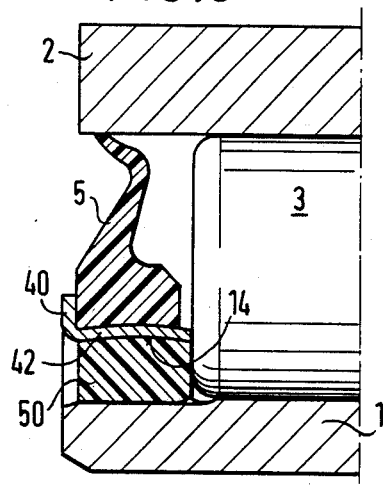
FIG. 8 shows a combination of sealing ring and retaining ring, with a separate filler piece.

According to the invention and the embodiments thereof as shown in the drawings, a double row bearing with cylindrical rollers is assembled as illustrated in FIGS. 1 to 5. The bearing has inner and outer ball race rings 1 and 2. The inner ball race ring 1 has two lipped outer rims 13, and a center rim 12. The outer ball race ring has only a center rim 22. At least one of the outer rims, for example the left rim 13 in FIG. 1, has a feed notch 10 for receiving rollers 3. If the outer ball race ring has a lipped outer race rim 23, as illustrated in FIG. 6, then lipped outer race rims 23 on both rings can be provided with a feed notch having a contour adapted to receive individual cylindrical rollers.

The cylindrical roller bearing as illustrated in FIGS. 1 to 5 is assembled such that the cylindrical rollers 30 are placed in a first track of the inner ball race ring 1. The outer ball race ring 2 is then slipped axially over the inner ring 1 and its fully-complemented first track (as shown in FIG. 3). The cylindrical rollers 3 for the second track are then inserted one at a time through the feed notch 10 until the second track is also fully complemented with rollers. During this process, the rollers are constrained to remain parallel and possibility of axial play between the inner and outer race rings of the bearing is eliminated by means of the resulting bracing of the inner and outer race rings against the end faces of the cylindrical rollers. This bracing is indicated by arrows in FIG. 5.

The retaining ring 4 closes the feed notch 10 against escape of the cylindrical rollers. The retaining ring 4 can be bent from a flat steel band and can be welded into a loop. Retaining ring 4 is placed on rim 13 under pressure. Being forced onto rim 13, the retaining ring 4 stretches and when its final position is obtained, adapts to the shape of the rim, thereby ensuring secure positioning. The bearing with cylindrical rollers as illustrated in FIG. 1 to 5, when fully complemented and provided with the retaining ring 4, is absolutely self-secured. The bearing cannot fall apart after assembly, and none of the cylindrical rollers can move out of their track.

FIG. 6 shows a single roller bearing. The outer ball race 2 has a larger wall thickness and two outer race rims 23. Furthermore, feed notches 10 and 20 are provided in each of the rims 13 and 23, on the inner and outer rings, respectively. Unlike the initially-described embodiment in which a retaining ring bears radially inwardly on the inner race 1, the retaining ring 42 is now attached to the rim 23 of the outer ball race 2 in a manner like that described above.

FIG. 7 shows a cross section of a closed bearing, wherein the retaining ring 42 consists of plastic, for example a reinforced polyamide, and is combined with a sealing ring 5 closing the space between rings 1 and 2. Both parts 5 and 42 can be formed integrally, and preferably in that case the sealing ring 5 consists of relatively softer material, for example, polyurethane elastomer.

Figure 9:
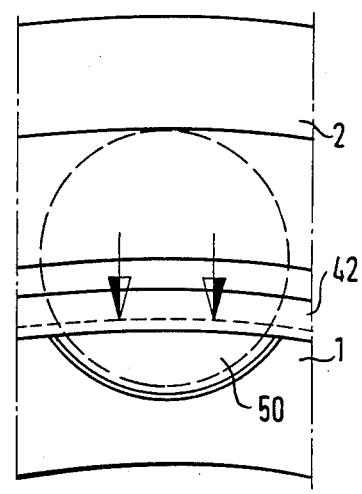
FIG. 9 is a partial side view of a bearing section showing the direction of friction pressure extended on the filler piece by the retaining ring, the friction pressure being indicated by arrows.

Assembly and prestressed insertion of retaining ring 42 as combined with a sealing ring are done in the same manner as shown in FIGS. 3 to 5. The retaining ring 42 resiliently holds itself in place and a part extends into the recess 11 of the inner ball race. Another embodiment of a closed bearing is shown in FIGS. 8 and 9. In this embodiment the retaining ring 42 is shown with an outer angular edge 40. The sealing ring 5 is placed on the retaining ring before assembly and inserted together with the retaining ring. The filler piece 50 for closing the filling notch does not require special mounting support, and may be held in place by the frictional pressure of the retaining ring 42.

Figure 10:
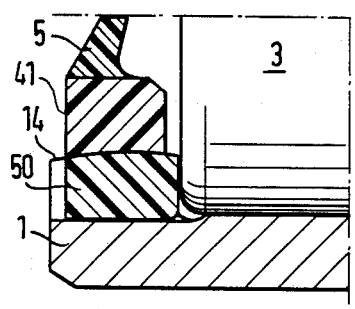
FIG. 10 illustrates an embodiment of the invention wherein the retaining ring bears indirectly against the end face of the cylindrical rollers and where the filler piece is made of reinforced plastic.

FIG. 10 shows another combination according to the invention, including these parts. The sealing ring 5 of relatively softer material is rigidly connected with the retaining ring 41, made of a harder plastic. This embodiment is arranged such that the plastic retaining ring 41 only indirectly provides axial restriction of the cylindrical rollers 3, due to ring 41 supporting the filling piece 50 and the latter bearing on the cylindrical rollers. Good mounting support for the filler piece 50 is ensured by means of a concave or convex shape of the contact surface 14, thereby tending to keep the retaining ring in place. Before or after assembly the filler piece can be welded to the retaining ring is a simple manner.

Figure 11:
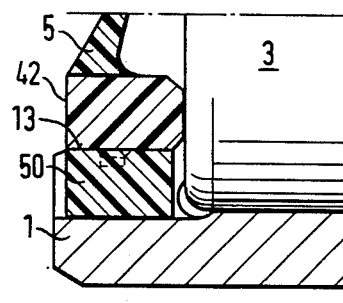
FIG. 11 is a three part combination of sealing ring, retaining ring and filler piece, wherein the filler piece is of the same material as the sealing ring.

In the embodiment shown in FIG. 11, the retaining ring 42 directly secures the cylindrical rollers 3. In this respect, the embodiment of FIG. 11 is similar to the embodiment of FIG. 7. The filler piece 50 consists of soft packing or sealing material and is also held in place by the frictional pressure of the retaining ring.

Figure 12:
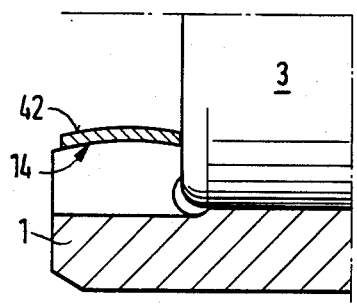
FIG. 12 is a bearing open to the outside with a nonplanar rim surface.
Figure 13:
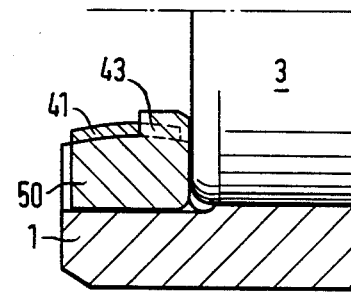
FIG. 13 illustrates another embodiment of the open bearing of the invention, with indirect pressure from the retaining ring applied to the rollers through the filler piece, and wherein the filler piece comprises a different material from the retaining ring and includes additional axial restriction in the form of a supporting projection.

FIGS. 12 and 13 illustrate another open bearing embodiment, with a retaining ring formed of a closed band of material. In FIG. 12, the retaining ring 42 is pushed onto the arched convex surface 14 of the rim 13. By this structure alone the retaining ring is sufficiently held in place in direct contact with the end faces of the cylindrical rollers 3, to prevent their escape through the loading notch.

It is also possible in a similar embodiment to use indirect contact of the retaining ring 41, for exerting the necessary restriction against the end face of the cylinder rollers 3. FIG. 13 shows a retaining ring 41 with a pocket 43 and a projection on the filler piece 50, which ensures a secure connection between retaining ring 41 and filler piece 50.

Details of the individual embodiments are partially interchangeable, and exemplary rather than exhaustive groupings are shown herein. In place of recesses 11 to further secure retaining ring 42, other forms of unevenness, for example roughened surfaces, ribs or similar uneven features may be provided. The selection and type of structural connections depend to some extent upon the individual types of bearings and their particular applications. In each embodiment except that of FIG. 6, the retaining ring is inserted over one of the rims and bears inwardly. As shown in FIG. 6, however, it is also possible to place the retaining ring inside a rim to bear outwardly in the radial direction.

In multiple row bearings according to the invention, only one of the ball races has two outer rims per cylindrical row. If more than two tracks are provided, then all but one of the tracks of a ball race can be fully loaded with rolls before the other ball race is pushed axially over the first. The last track requires only one rim, and with the retaining ring axially secures the whole structure.

The invention having been disclosed, additional embodiments will now become apparent to persons skilled in the art. Reference should be made to the appended claims rather than the foregoing specification as indicating the true scope of the subject invention.

What is claimed is:

1. A roller bearing comprising:
   a plurality of cylindrical rollers;
   an integral inner race and an integral outer race for the rollers, the inner and outer races being coaxial, the races being provided with lipped rims for axial retention of the cylindrical rollers, at least one of the races having a feed notch in an outer one of the rims, the feed notch to be blocked to prevent dropping out of the rollers into the feed notch; and,
   a retaining ring blocking the feed notch, the retaining ring being disposed on one of the rims and bearing directly against an exposed end surface of the cylindrical rollers at the feed notch,
   wherein the retaining ring is closed on itself and comprises an elastic material and bears directly against the end surface of the cylindrical rollers.

2. A bearing according to claim 1, further comprising a sealing ring connected to the retaining ring, the bearing being thereby sealed.

3. A bearing according to claim 2, wherein the retaining ring and sealing ring are connected in one piece and are made of resilient material.

4. A bearing according to claim 3, wherein the retaining ring and sealing ring are plastic.

5. A bearing according to claim 2, wherein the retaining ring and sealing ring are made of a two-component plastic material, one component being of a softer plastic material and another component forming the retaining ring being of a harder plastic material.

6. A bearing according to claim 1, further comprising a filler piece mounted in the feed notch and retained in position by the retaining ring and resting against the face of the cylindrical rollers.

7. A bearing according to claim 1, wherein the retaining ring is mounted on one of the rims and said one of the rims has an uneven surface for securing the retaining ring.

8. A bearing according to claim 1, wherein the retaining ring is mounted on one of the rims and the surface of the one rim is concave.

9. A bearing according to claim 1, wherein an end of the bearing is closed by a sealing ring, the retaining ring and a filler piece being attached together as a structural unit and attached to the bearing.

10. A bearing according to claim 1, wherein a sealing ring, the retaining ring and a filler piece are connected to one another such that the filler piece secures the cylindrical rollers against escape through the feed notch.

11. A bearing according to claim 1, comprising a single row of the cylindrical rollers.

12. A bearing according to claim 1, comprising a plurality of rows of the cylindrical rollers.

13. A bearing according to claim 1, wherein a surface of the one rim holding the retaining ring is convex.

14. A process for manufacture of a bearing having cylindrical rollers secured against axial displacement in the area of a feed notch of the bearing, comprising the steps of:
   providing a integral inner race and an integral outer race for the cylindrical rollers, the races being lipped with rims and an outer one of the rims of the races having a feed notch;
   loading the cylindrical rollers between the races through the feed notch;
   attaching at least one of a retaining ring and filler piece by prestressing such that at least one of the retaining ring, a sealing ring 1 and filler piece bear axially against and along the circumferential extent of exposed ends of the cylindrical rollers at the feed notch, retaining the rollers in position.

15. The process of claim 14, wherein during insertion of the retaining ring, pressure in a direction parallel to axes of the cylindrical rollers is exerted on said one of the retaining ring, sealing ring and filler piece and the other ball race on the opposite side is braced.

16. The process of claim 14, wherein the retaining ring is forced over the rim and exerts an inward pressure on the rim.

17. The process of claim 14 wherein the retaining ring is forced within the rim, and exerts a pressure outwardly.

18. A roller bearing comprising:
a plurality of cylindrical rollers;
an integral inner race and an integral outer race for the rollers, the inner and outer races being coaxial, the races being provided with lipped rims for axial retention of the cylindrical rollers, at least one of the races having a feed notch in an outer one of the rims, the feed notch to be blocked to prevent dropping out of the rollers into the feed notch; and,
a retaining ring blocking the feed notch, the retaining ring being disposed on one of the rims and bearing directly against an exposed end surface of the cylindrical rollers at the feed notch,
wherein a surface shape of the one rim is selected from the group consisting of a concave shape and a convex shape.

* * * * *

UNITED STATES PATENT AND TRADEMARK OFFICE
CERTIFICATE OF CORRECTION

PATENT NO. : 4,787,758
DATED : November 29, 1988
INVENTOR(S) : Jacob

It is certified that error appears in the above-identified patent and that said Letters Patent is hereby corrected as shown below:

IN THE DRAWINGS:

In Fig. 1, the numeral "42" should be --4--.

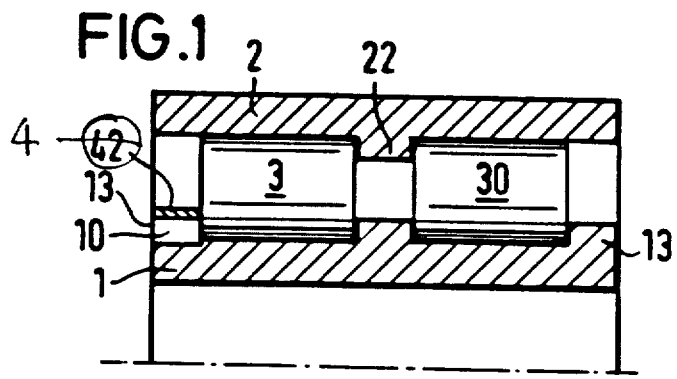

UNITED STATES PATENT AND TRADEMARK OFFICE
CERTIFICATE OF CORRECTION

PATENT NO. : 4,787,758

DATED : November 29, 1988

INVENTOR(S) : Jacob

It is certified that error appears in the above-identified patent and that said Letters Patent is hereby corrected as shown below:

Fig. 14, as shown below, should be added.

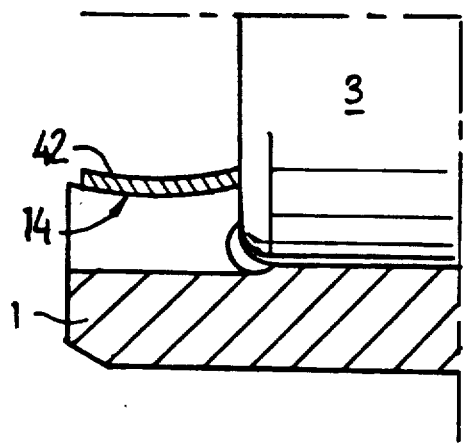

UNITED STATES PATENT AND TRADEMARK OFFICE
CERTIFICATE OF CORRECTION

PATENT NO. : 4,787,758

DATED : November 29, 1988

INVENTOR(S) : Jacob

It is certified that error appears in the above-identified patent and that said Letters Patent is hereby corrected as shown below:

IN THE SPECIFICATION:

Column 3, after the last line, insert the following:

--Fig. 14 is a bearing open to the outside with a concave rim surface.--

Column 5, line 33, after "notch.", insert --Fig. 14 illustrates an open bearing embodiment similar to Fig. 12; however, surface 14 of rim 13 is concave rather than convex in the embodiment according to Fig. 14.--.

Column 6, line 67, after "ring", second occurrence, delete the numeral "1".

Signed and Sealed this

Second Day of May, 1989

Attest:

DONALD J. QUIGG

Attesting Officer

Commissioner of Patents and Trademarks